US005226993A

United States Patent [19]

Tukakoshi et al.

[11] Patent Number: 5,226,993

[45] Date of Patent: Jul. 13, 1993

[54] SET OF ORNAMENTS

[75] Inventors: Yukio Tukakoshi; Isao Oyobe; Takao Yamamoto, all of Kanagawa, Japan

[73] Assignee: Marui Industry Co., Ltd., Kanagawa, Japan

[21] Appl. No.: 740,619

[22] Filed: Aug. 5, 1991

Related U.S. Application Data

[62] Division of Ser. No. 448,868, Dec. 12, 1989, abandoned.

[30] Foreign Application Priority Data

Aug. 11, 1989 [JP] Japan .................................. 1-206686

[51] Int. Cl.[5] .................................................. B32B 31/04

[52] U.S. Cl. ........................................ 156/63; 156/247; 156/249; 156/306.6; 40/594; 40/595; 40/622; 40/630; 428/118; 428/900; 446/124

[58] Field of Search ................. 156/63, 242, 245, 246, 156/247, 249, 277, 306.6, 297; 40/622, 594, 595, 630; 428/118, 900; 446/124

[56] References Cited

U.S. PATENT DOCUMENTS

| | | | |
|---|---|---|---|
| 1,624,741 | 12/1926 | Leppke | 428/900 |
| 2,061,294 | 11/1936 | Stephenson | 40/594 |
| 3,453,761 | 11/1966 | Giesecke | 428/118 |
| 3,461,583 | 8/1969 | Buck | 40/595 |
| 3,526,986 | 9/1970 | Dempnock et al. | 40/595 |
| 3,601,917 | 7/1969 | Shankman | 40/622 |
| 4,480,399 | 11/1984 | Teti | 40/594 |
| 4,802,854 | 2/1989 | Davis | 446/124 |

FOREIGN PATENT DOCUMENTS

| | | | |
|---|---|---|---|
| 1014894 | 12/1965 | United Kingdom | 40/595 |

*Primary Examiner*—Caleb Weston
*Attorney, Agent, or Firm*—Wenderoth, Lind & Ponack

[57] ABSTRACT

An ornament set includes a plurality of ornament units having double-sided adhesive sheets adhered to the back thereof, and a retainer strip adhered to the front sides thereof to hold the ornament units in a predetermined relationship. A method for manufacturing the ornament set providing a plurality of ornament units respectively having front surfaces to be displayed and back surfaces to be attached to a body to be decorated, and providing an arranging tool having recesses formed therein in relative positions corresponding to relative positions in which the ornament units are to be attached to the body to be decorated. The ornament units are positioned in the recesses of the arranging tool, respectively, such that the front surfaces of the ornament units are respectively facing the bottoms of the recesses. A double-sided adhesive tape is adhered to the back surface of each of the ornament units, and a release strip is applied onto respective surfaces of the double-sided adhesive sheets. With the ornament units connected in series by the release strip, the ornament units are extracted from the recesses of the arranging tool, and after extracting the ornament units from the recesses of the arranging tool, a substantially non-expansible retainer strip is applied to the front surfaces of the ornament units.

8 Claims, 2 Drawing Sheets

SET OF ORNAMENTS

This application is a division of application, Ser. No. 07/448,868 filed on Dec. 12, 1989, abandoned.

BACKGROUND OF THE INVENTION

The present invention relates to a set of ornaments or an array of ornaments for providing a predetermined emblem or mark, which comprise the combination of plural ornamental units each having an independent configuration such as a character, figure, symbol or the like, and to a method for manufacturing such set of ornaments.

A set of ornaments or an array of ornaments made of thin synthetic resin material and comprising the combination of plural ornamental units each having an independent configuration such as a character, figure or the like to provide a predetermined emblem is already known (refer to the Japanese Patent Publication No. 63-18674). This conventional set of ornaments has a laminated structure including a binding sheet having both surfaces coated by adhesive (referred to as "double-sided adhesive sheet" hereinafter) attached to the back of each ornamental unit, a release strip covering the double-sided adhesive sheet on the ornamentals units, and a retainer strip attached to the front surface of the ornament set for holding the ornamental units in a predetermined relative position. In use, the release strip is peeled from the double-sided adhesive sheet, the exposed adhesive surface of the double-sided adhesive sheet is fixed to a body to be ornamentalized or decorated, and, thereafter, the retainer strip is removed from the front surface of the ornament set, thereby applying the emblem on the body.

In general, a rear panel of a passenger car can have a set of ornaments attached thereto to provide and emblem, similar to the above-mentioned ornament set. However, in the past, such ornaments had a thickness of a few millimeters or more and were made of relatively hard material. In this case, unlike the above-mentioned ornament set made of resin sheet material, the ornaments were molded integrally with a holding bar or holding base plate (for holding the ornament units together) made of the same material as that of the ornaments. In use, the molded ornament set with the holding bar was attached to the body to be decorated, through a double-sided adhesive sheet.

However, this conventional ornament set having the holding bar molded integrally therewith limits the range of possible ornamentations, since the ornament units (characters and the like) must be held or retained together by the integral holding bar or base plate. That is to say, each of the ornament units cannot inevitably be seen independently. In order to avoid this, only the holding bar or base plate can be painted in the same color as that of the body as if the ornament units are seen independently. However, this raises a problem in that the cost of the ornament set increases and the manufacture and/or control of the ornament set is more troublesome.

Further, a method wherein ornament units are formed independently and are attached one by one to a body to be decorated has also been proposed. However, in this case, if a double-sided adhesive sheet or tape is used for attaching each ornament unit to the body, since an area of the back surface of each ornament unit is small, the adhesion force provided by the double-sided adhesive sheet fixed to the back of the ornament unit will be too weak to hold the ornament unit on the body adequately. Accordingly, in this method, the double-sided adhesive sheet was not used, and, alternatively, a projection was formed on the back of each ornament unit and a corresponding hole was formed in the body so that each ornament unit was attached to the body by inserting the projection into the corresponding hole and by fixing the projection in the hole by means of an appropriate fastener.

However, this method has disadvantages in that corrosion of the body occurs due to water entering through the holes, and the attaching operation is troublesome, takes a long time and is expensive.

SUMMARY OF THE INVENTION

Recently, the double-sided adhesive sheet has been remarkably improved to increase the adhesion force thereof.

In view of the above, an object of the present invention is to provide a set of ornaments and a method for manufacturing the same, which can eliminate the abovementioned conventional drawbacks.

In order to achieve the above object, the present invention provides a set of ornaments comprising a plurality of hard ornament units each having a thickness of at least a few millimeters and including a double-sided adhesive sheet fixed to the back thereof, and a retainer strip adhered to front surfaces of the ornament units for holding the ornament units in a predetermined relative position.

The retainer strip is preferably made of less expandible material such as a thermoplastic polyester resin sheet to maintain the ornament units in the predetermined relative positional relation. Each ornament unit is preferably made of hard resin material such as ABS resin, and the surface thereof may be subjected to chrome plating.

According to a preferred embodiment of the present invention, a release strip is applied to the exposed surfaces of the double-sided adhesive sheets.

According to another embodiment of the present invention, the retainer strip comprises a single strip adhered to only the front surfaces of the plural ornament units.

According to a further embodiment of the present invention, the retainer strip is adhered to the ornament units in such a manner that the retainer strip encloses the front surface and both sides of each ornament unit.

According to an additional embodiment of the present invention, the retainer strip is adhered to the ornament units in such a manner that the retainer strip partially encloses the back of each ornament unit.

A method for manufacturing the above-mentioned set of ornaments according to the present invention comprises the steps of: injection molding a synthetic resin molded product having a plurality of ornament units spaced from each other by a predetermined distance and providing a predetermined emblem, and a supporting bar connected to the backs of the ornament units to hold the ornament units together; applying a predetermined surface treatment such as chrome plating on at least a front surface of each ornament unit; preparing an arranging tool having recesses disposed therein in positions corresponding to correct positions where the ornaments units are attached to a body to be decorated; positioning the ornament units by inserting the ornament units into the recesses of the arranging tool with the front surfaces of the ornament units faced toward the bottoms of the recesses; removing the supporting bar from the backs of the ornament units to separate the ornament units from each other; adhering to the back of each ornament unit a doublesided adhesive sheet cut to conform to the configuration of the back of each ornament unit; applying a release strip onto exposed outer surfaces of the double-sided adhesive sheets; and extracting the ornament units connected in series by the release strip from the recesses of the arranging tool and applying a substantially non-expansible retainer strip to the front surfaces of the ornament units.

PREFERRED EMBODIMENT OF THE INVENTION

Figure 1:
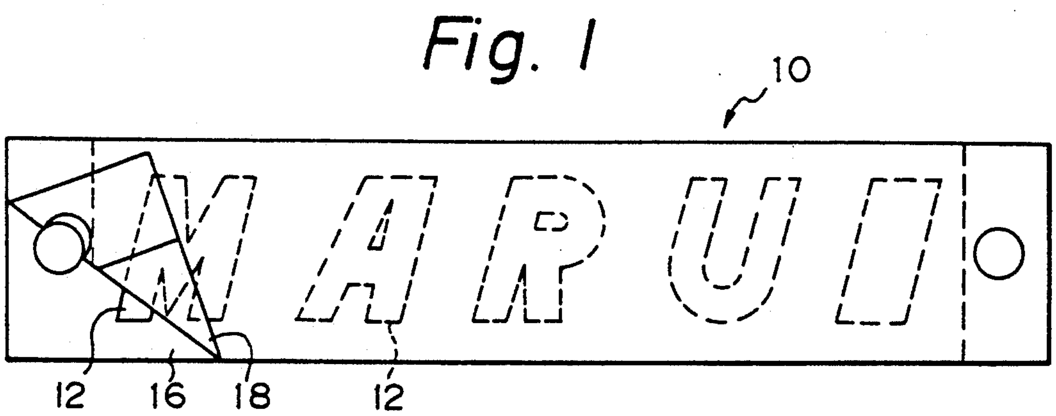
FIG. 1 is a plan view of a set of ornaments according to a preferred embodiment of the present invention.
Figure 2:
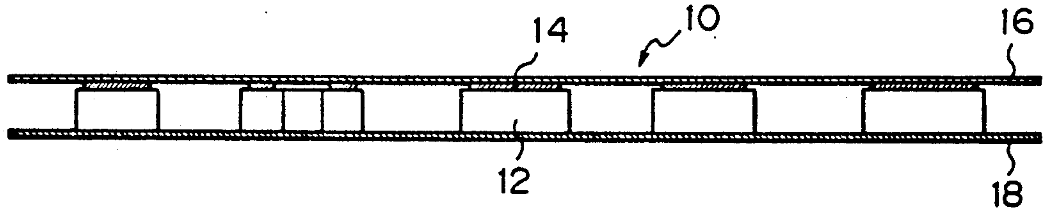
FIG. 2 is a partial longitudinal sectional view of the ornament set of FIG. 1.

FIGS. 1 and 2 show a set of ornaments 10 according to a first embodiment of the present invention.

As shown in FIG. 2, the set of ornaments or the ornament set 10 includes a plurality of ornament units 12 (in the illustrated embodiments, Roman letters) arranged in a predetermined positional relationship so as to be attached to a body plate of an automobile or the like, double-sided adhesive sheets 14 adhered to the back of each ornament unit, a release strip 16 applied onto the adhesive sheets 14, and a retainer strip 18 adhered to front surfaces of the ornament units, for holding the ornament units while maintaining the positional relationship. Each double-sided adhesive sheet 14 has a contour similar to that of the back of the corresponding ornament unit but somewhat smaller than the latter, and is adhered to the corresponding ornament unit so as not to go beyond the border of the back thereof.

When the ornament units 12 in the ornament set 10 are attached to the body plate of the automobile or the like, first of all, the release strip 16 is peeled from the double-sided adhesive sheets 14 to expose the latter, and then the exposed surfaces of the adhesive sheets 14 are pressed against the body plate. After the double-sided adhesive sheets 14 have been fixed firmly to the body plate, the retainer strip 18 is peeled from the front surfaces of the ornament units 12. In this way, the attaching operation is completed. Incidentally, the ornament units can be attached to predetermined positions on the body plate by, for example, aligning predetermined portions of the outer edge of the retainer strip with predetermined marks provided on the body plate or by aligning a reference line provided on the a retainer strip which is made of a transparent material with a reference line provided on the body plate.

FIGS. 3 to 6 show the steps for manufacturing the above-mentioned ornament set 10.

Figure 3:
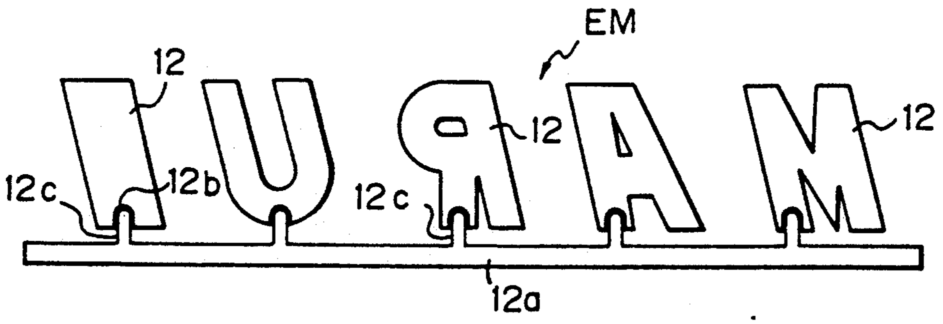
FIGS. 3 to 6 are explanatory views for explaining the steps of a method for manufacturing the ornament set of FIG. 1.
Figure 4:
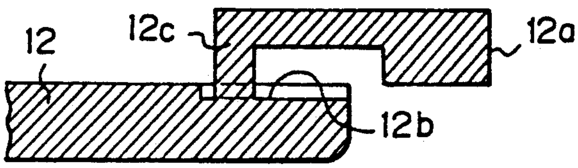

According to these steps, first of all, a synthetic resin molded product EM wherein a plurality of ornament units 12 are arranged substantially in their relative positions is injection molded (see FIG. 3). The molded product includes the plurality of ornament units 12, a supporting bar 12*a*, and connecting members 12*c* connecting the supporting bar to cavities 12*c* formed in the backs of the ornament units 12 so as to connect the ornaments units together.

Figure 5:
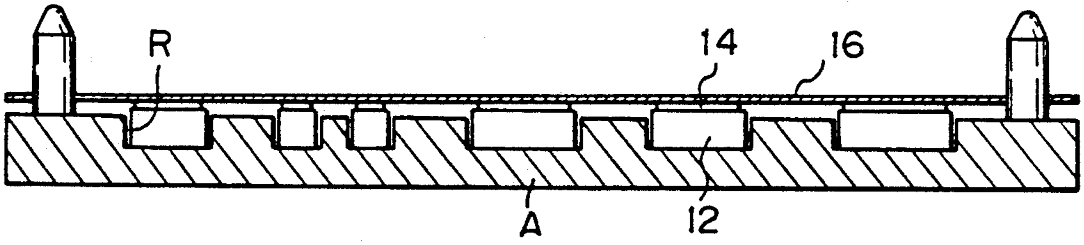
Figure 6:
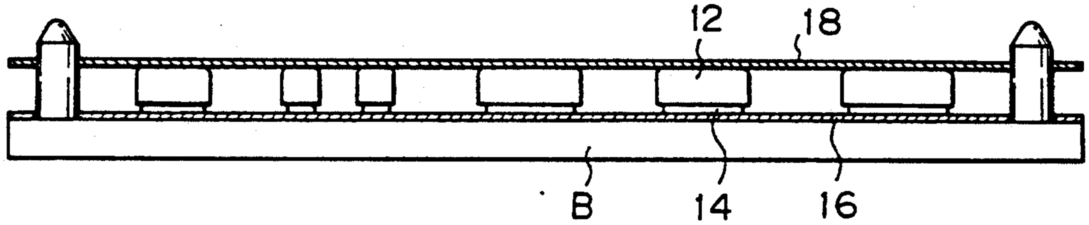

Then, a predetermined plating is applied to the surface of the synthetic resin molded product. Thereafter, as shown in FIG. 5, the ornament units 12 are inserted into recesses R formed in an arranging tool A with the front surfaces of the ornament units facing toward the bottoms of the recesses. Each recess R is designed to mate with the configuration of the corresponding ornament unit, and these recesses are arranged in a correct positional relationship for correctly positioning the ornament units in the recesses with respect to each other. Accordingly, by inserting the ornament units in the recesses of the arranging tool, the ornament units can be correctly positioned. In this condition, the supporting bar 12*a* and the connecting members 12*c* are removed from the molded product to separate the ornament units from each other, and, thereafter, the double-sided adhesive sheets 14 are adhered to the backs of the corresponding ornament units received in the recesses of the arranging tool, and the release strip 16 is applied onto the backs of the double-sided adhesive sheets (FIG. 5). Then, the ornament units 12 held together by the release strip are extracted from the arranging tool A. Thereafter, the ornament units are turned over such that the front surfaces thereof face upwardly and are then positioned with respect to a further tool B by utilizing the release strip as a reference (FIG. 6). Finally, the retainer strip 18 is adhered to the front surfaces of the ornament units. In this way, the manufacture of the ornament set is completed.

Figure 7:
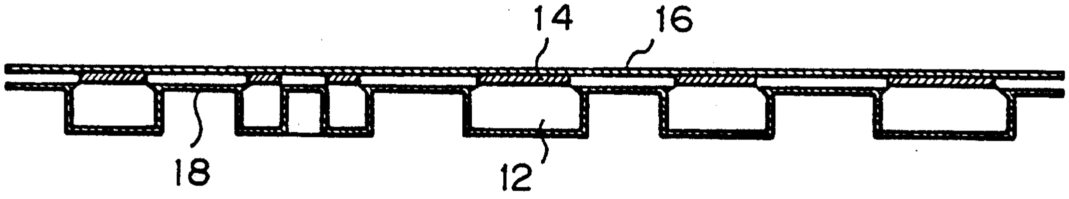
FIG. 7 is a partial longitudinal sectional view of the ornament set according to a second embodiment of the present invention.
Figure 8:
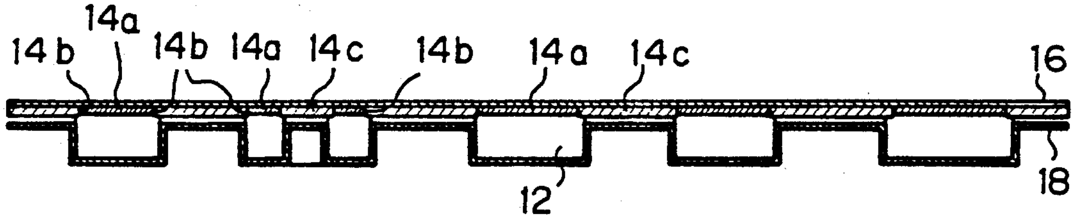
FIG. 8*a* is a partial longitudinal sectional view of the ornament set before prior to completion, according to a third embodiment of the present invention.
FIG. 8*b* is a partial longitudinal sectional view of the ornament set after completion, according to the third embodiment of the present invention.
Figure 8:
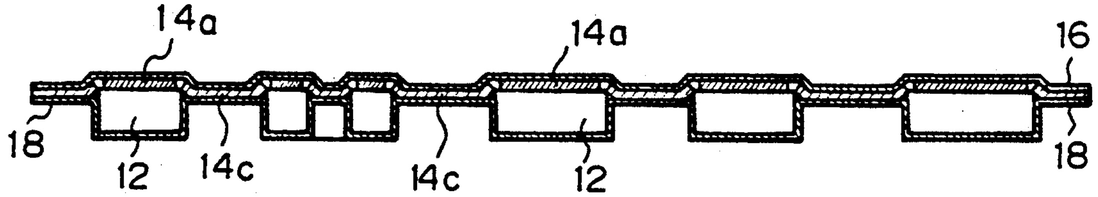

FIGS. 7 and 8 show ornament sets according to second and third embodiments of the present invention, respectively.

The ornament set shown in FIG. 7 has substantially the same structure as that of the first embodiment, regarding the arrangement of the ornament units 12, double-sided adhesive sheets 14 and release strip 16. However, in this second embodiment, the retainer strip 18 is not adhered to only the front surfaces of the ornament units 12, but encloses the ornament units so that the retainer strip encloses both sides of each ornament unit and also encloses even the back of each ornament unit partially. With this arrangement, the holding force of the retainer strip for holding the ornament units is further increased.

In order to attach the ornament units 12 in the ornament set to the body to be decorated, like the ornament set shown in FIGS. 1 and 2, the release strip 16 is peeled from the double-sided adhesive sheets 14 to expose the latter, and then, the exposed surfaces of the adhesive sheets 14 are fixed to the body. After the ornament units have been firmly fixed to the body, the retainer strip 18 is removed from the front surfaces of the ornament units.

In the third embodiment shown in FIG. 8, first of all, as shown in FIG. 8*a*, a double-sided adhesive sheet is adhered to the back of the ornament units, the adhesive sheet having a plurality of parts 14*a* each defined by a cut line 14b so as to have a configuration corresponding to that of the corresponding ornament unit 12; and then, the release strip 16 is applied onto the double-sided adhesive sheet. Thereafter, the retainer strip 18 is adhered to the ornament units from the front sides thereof in such a manner that the retainer strip encloses or surrounds the ornament units 12. Then, the release strip 16 is deformed so that portions 14c of the double-sided adhesive sheet which are outside of the cut lines 14b and not adhered to the backs of the ornament units 12 adhere to the retainer strip 18.

The ornament units in the ornament set according to this third embodiment can be attached to the body to be decorated, in the same manner as those of the previous embodiments.

What is claimed is:

1. A method for manufacturing an ornament set, comprising the steps of:

providing a plurality of ornament units respectively having front surfaces to be displayed and back surfaces to be attached to a body to be decorated;

providing an arranging tool having recesses formed therein in relative positions corresponding to relative positions in which said ornament units are to be attached to the body to be decorated;

positioning said ornament units in said recesses of said arranging tool, respectively, such that said front surfaces of said ornament units are respectively facing the bottoms of said recesses;

adhering to said back surface of each of said ornament units a double-sided adhesive sheet;

applying a release strip onto respective surfaces of said double-sided adhesive sheets;

with said ornament units connected in series by said release strip, extracting said ornament units from said recesses of said arranging tool; and after extracting said ornament units from said recesses of said arranging tool, applying a substantially non-expansible retainer strip to said front surfaces of said ornament units.

2. A method as recited in claim 1, wherein said step of adhering is performed before said step of applying a release strip; and said step of applying a release strip comprises applying a release strip onto exposed surfaces of said double-sided adhesive sheets opposite the surfaces thereof which are adhered to said ornament units.

3. A method as recited in claim 1, wherein said step of providing a plurality of ornament units comprises injection molding a synthetic resin product including said plurality of ornament units and a supporting bar connecting said ornament units in spaced apart relation.

4. A method as recited in claim 3, further comprising the step of:

after performing said step of positioning said ornament units in said recesses of said arranging tool, detaching said supporting bar from said ornament units.

5. A method as recited in claim 4, further comprising the step of:

prior to performing said step of providing an arranging tool, applying a predetermined surface treatment to at least a front face of each of said ornament units.

6. A method as recited in claim 5, wherein said step of applying a predetermined surface treatment comprises applying a chrome plating to at least said front face of each of said ornament units.

7. A method as recited in claim 1, further comprising the step of:

prior to performing said step of providing an arranging tool, applying a predetermined surface treatment to at least a front face of each of said ornament units.

8. A method as recited in claim 7, wherein said step of applying a predetermined surface treatment comprises applying a chrome plating to at least said front face of each of said ornament units.

* * * * *